Patented Nov. 18, 1924.

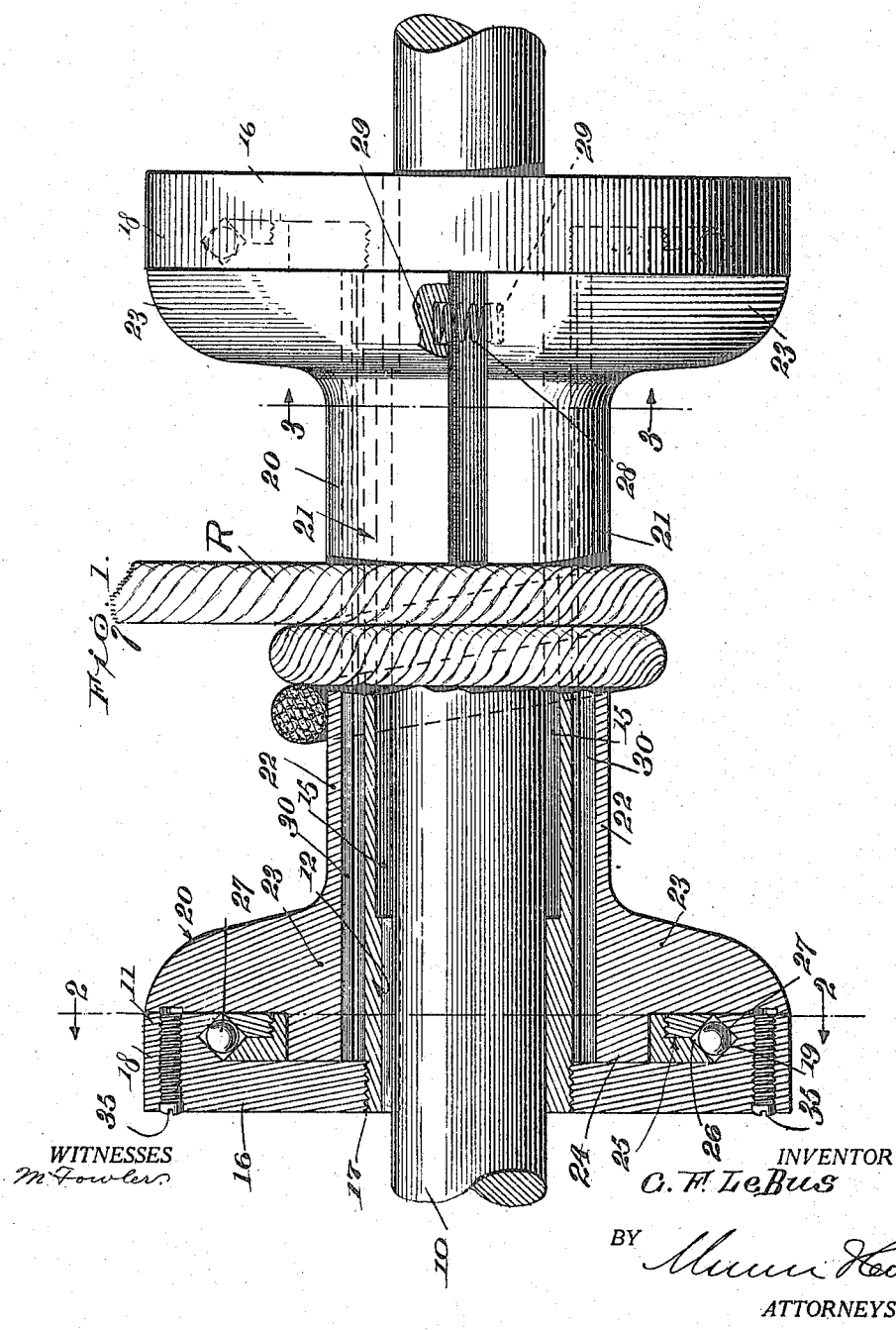

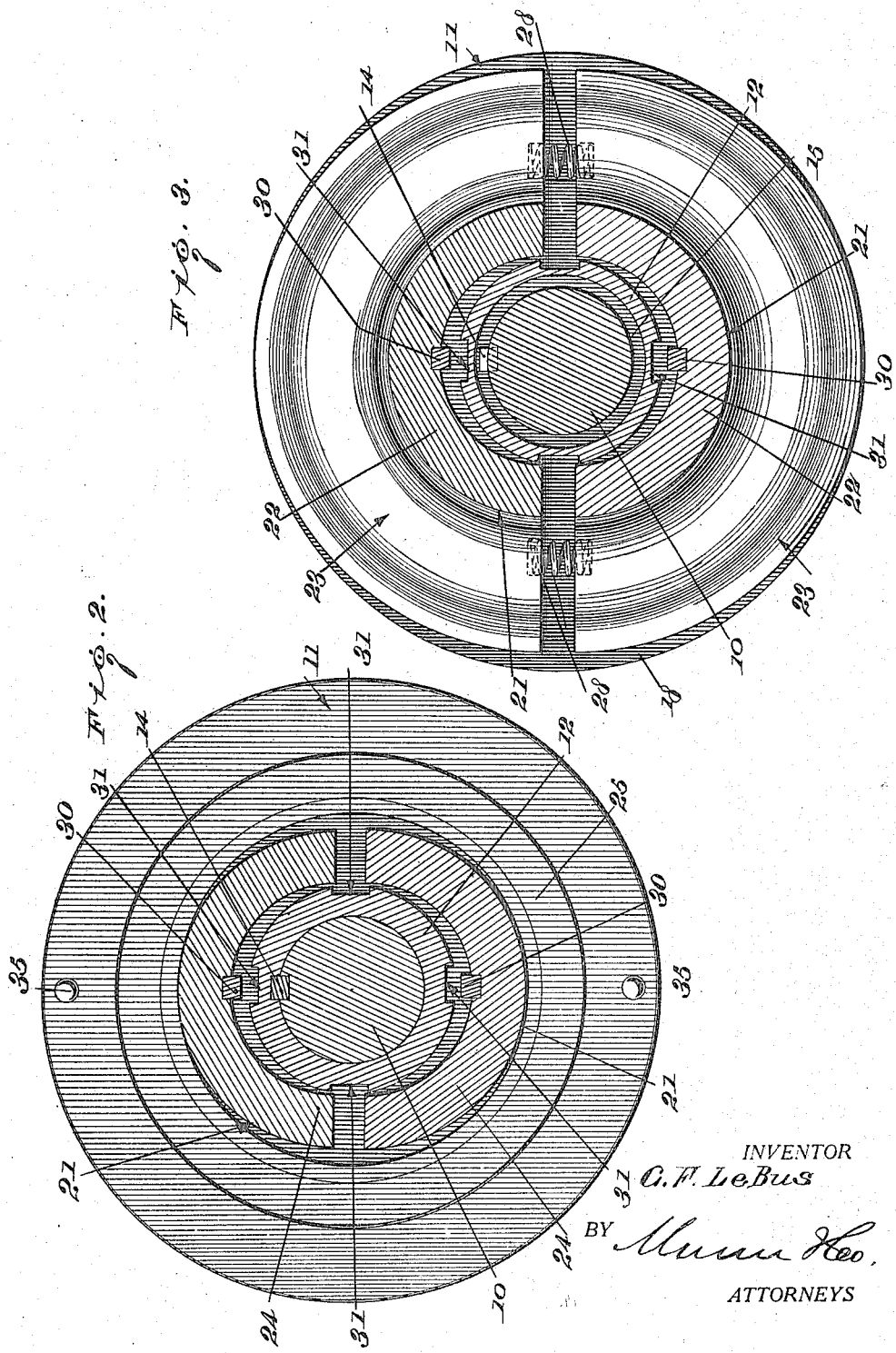

1,515,779

UNITED STATES PATENT OFFICE.

GEORGE FRANKLIN LE BUS, OF ELECTRA, TEXAS.

CLUTCH WINCH HEAD.

Application filed February 19, 1924. Serial No. 693,843.

*To all whom it may concern:*

Be it known that I, GEORGE F. LE BUS, a citizen of the United States, and a resident of Electra, in the county of Wichita and State of Texas, have invented certain new and useful Improvements in Clutch Winch Heads, of which the following is a specification.

This invention relates to a clutch winch head and has for its object to provide a device of this character which has a high safety factor, which reduces to a minimum wear on the rope and drum, which is so constituted and operable as to effect a substantial saving in time and labor, and which is in general of simple and durable construction, reliable, safe and semiautomatic in operation, and easy and comparatively inexpensive to manufacture and operate.

Other objects and advantages of the invention reside in certain novel features of the construction, combination and arrangement of parts which will be hereinafter more fully described and particularly pointed out in the appended claims, reference being had to the accompanying drawings forming part of this specification, and in which:

Figure 1 is a view, partly in side elevation and partly in diametrical section, showing one embodiment of the invention;

Figure 2 is a view in transverse section on line 2—2 of Figure 1; and

Figure 3 is a similar view on line 3—3 of Figure 1.

Referring to the drawings the numeral 10 designates a line shaft which constitutes the driving element. The winch which constitutes the present invention is designated generally at 11 and comprises a sleeve 12 keyed or otherwise fixed, as at 14, to the shaft 10. The inner periphery of the sleeve 12 may be cut away to some extent intermediate its ends, as indicated at 15, to tighten the sleeve if this is found desirable.

Annular end plates 16 are suitably fixed to the ends of the sleeve 12 and may be threadedly connected thereto, as at 17. The end plates 16 are provided with inwardly directed marginal flanges 18 having V-shaped grooves 19 around their internal peripheries.

A winch head or drum, designated generally at 20, is mounted on the sleeve 12 between the end plates 16 and is made up of a number of sections or members 21. Each of the sections or members 21 comprises a body portion 22 taking the form of a section of a cylinder, and integral or suitably connected heads or end pieces 23 taking the form of sections of annuli. In the embodiment herein shown the drum 20 comprises a pair of sections; the body portions 22 are of semicylindrical form, and the heads 23 are of substantially semiannular form.

Each head 23 has integrally formed therewith or suitably connected to the outer face thereof a semiannular shoulder 24. The shoulders 24 at the ends of the drum fit into freely rotatable rings 25 arranged in the spaces on the end plates 16 surrounded by the flanges 18. Each ring 25 has a U-shaped groove 26 in its outer periphery which is opposed to the groove 19 of its flange 18 in assembly, the grooves 19 and 26 defining ball races in which ball bearings 27 operate. The rings 25 have removable parts to permit of assembly.

Coil springs 28 are interposed between the sections 21 of the drum and have their ends fitted in sockets 29 provided therefor. These springs may be provided in any desired number and arrangement but preferably the springs are located near the ends of the drum, two springs being arranged on each side of the drum. The springs 28 are tensioned to force the sections 21 of the drum apart and to cause the shoulders 24 to engage the rings 25 so as to loosely support or mount the drum on the rotating shaft 10.

Means is provided for clutching or releasably securing the sections 21 of the drum 20 to the sleeve 12 and consequently to the shaft 10 and preferably comprises keys 30 secured to the sections 21 of the drum, the keys 30 extending longitudinally of the drum and projecting inwardly from the inner periphery thereof. The outer periphery of the sleeve 12 is provided with longitudinal keyways or grooves 31 with which the keys 30 are designed to coact. In the embodiment shown a single key 30 is fixed to each section 21 and four keyways 31 are formed in the sleeve 12 and while this is a suitable number and ratio, it is to be understood that the number or ratio may be varied as desired.

In practice the winch is used in conjunction with a rope or cat line designated at R and which is extended around the drum. One end of the rope is fastened to the object to be hoisted or pulled and when the operator pulls or draws on the other end, the rope is tightened about the drum and forces the sections 21 thereof toward each other notwithstanding the action of the coil spring 28. This brings the inner peripheries of the sections 21 into engagement with the outer periphery of the sleeve 12 so that the drum 20 now has a bearing on the sleeve 12, the shoulders 24 being disengaged from the rings 25. Moreover the keys 30 are now fitted into the keyways 31 so that the drum is in effect clutched to the shaft 10 and constrained to rotate therewith. As soon as the rope around the drum is slackened, the springs 28 expand the sections 21 to disengage the drum from the sleeve 12 and consequently from the shaft 10. When the sections 21 are expanded the shoulders 24 again engage the ring 25 to loosely support the drum 20 on the shaft 10 whereby the shaft 10 freely rotates while the drum 20 remains stationary.

This operation has a number of important advantages. In the first place it greatly enhances the safety factor for it eliminates the necessity for the dangerous practice of placing the rope around the drum for each pulling or hoisting operation. This danger will be appreciated when it is borne in mind that the drums heretofore used are all rotated at a higher rate of speed at all times. With this present invention the rope may be left on the drum at all times for when the winch is not in use in pulling or hoisting the drum is stationary although the shaft may be rotating in either direction. The fact that the drum remains stationary when the winch is not in use lessens to a minimum the wear on the rope and on the drum. A great saving in both time and labor results from the fact that the rope may be left on the drum at all times and need not be put on and taken off for each hoisting operation as has been necessary with winches heretofore used. At the same time just as soon as the rope is tightened around the drum the drum is clutched to the shaft and the winch is operative for pulling, hoisting or the like.

At times it may be desirable to constrain the drum 20 to rotate with the shaft 10 independently of the rope and in order to accomplish this purpose, binding or set screws 35 are threadedly mounted in the flanged portions of the end plates 16 and engageable with the heads 23 of the drum 20 to secure the drum 20 to the end plates 16 and consequently to constrain it to rotate with the shaft 10.

I claim:

1. In combination, a rotating shaft, a drum including sections, yieldable means for expanding the sections, means for mounting the expanded sections so that they are loose with respect to the shaft, and means for clutching the sections to the shaft when they are contracted.

2. In combination, a rotating shaft, a drum including sections, a rope extended around the sections and adapted to contract the sections when tightened, yieldable means for expanding the sections when the rope is loosened, means for mounting the expanded sections so that they are loose with respect to the shaft, and means for clutching the sections to the shaft when they are contracted.

3. In combination, a rotating shaft, a drum including sections, a rope extended around the sections and adapted to contract the sections when tightened, yieldable means for expanding the sections when the rope is loosened, means for mounting the expanded sections so that they are loose with respect to the shaft, means for clutching the sections to the shaft when they are contracted, and means independent of the rope for constraining the drum to rotate with the shaft.

4. In combination, a rotating shaft, a drum including a pair of sections, a rope extended around the sections and adapted to contract the sections when tightened, coil springs for expanding the sections when the rope is loosened, means for mounting the expanded sections so that they are loose with respect to the shaft, and means for clutching the sections to the shaft when they are contracted.

5. In combination, a rotating shaft, a sleeve fixed to the shaft, end plates carried by the sleeve and having inwardly directed marginal flanges provided with internal peripheral grooves, rings arranged in the spaces surrounded by the flanges of the end plates and having peripheral grooves defining ball races with the grooves of the flanges, ball bearings in said races, a drum arranged on the sleeve between the end plates and including a pair of sections, each section comprising a semi-cylindrical body portion having semi-annular end pieces provided with shoulders fitting in the rings, coil springs for expanding the sections so that the shoulders are engaged with the rings, a rope extended around the sections of the drum and adapted to contract the sections when tightened, and cooperating means between the sections of the drum and the sleeve for clutching the drum to the sleeve when the sections are contracted.

6. In combination, a rotating shaft, a sleeve fixed to the shaft, a drum including sections, yieldable means for expanding the sections, means carried by the sleeve for mounting the expanded sections so that they are loose with respect to the shaft, and means for clutching the sections to the shaft when they are contracted, said means including longitudinal keys fixed to the sections of the drum and projecting inwardly from the inner periphery thereof, said sleeve having longitudinal keyways cooperable with the keys.

GEORGE FRANKLIN LE BUS.